UNITED STATES PATENT OFFICE.

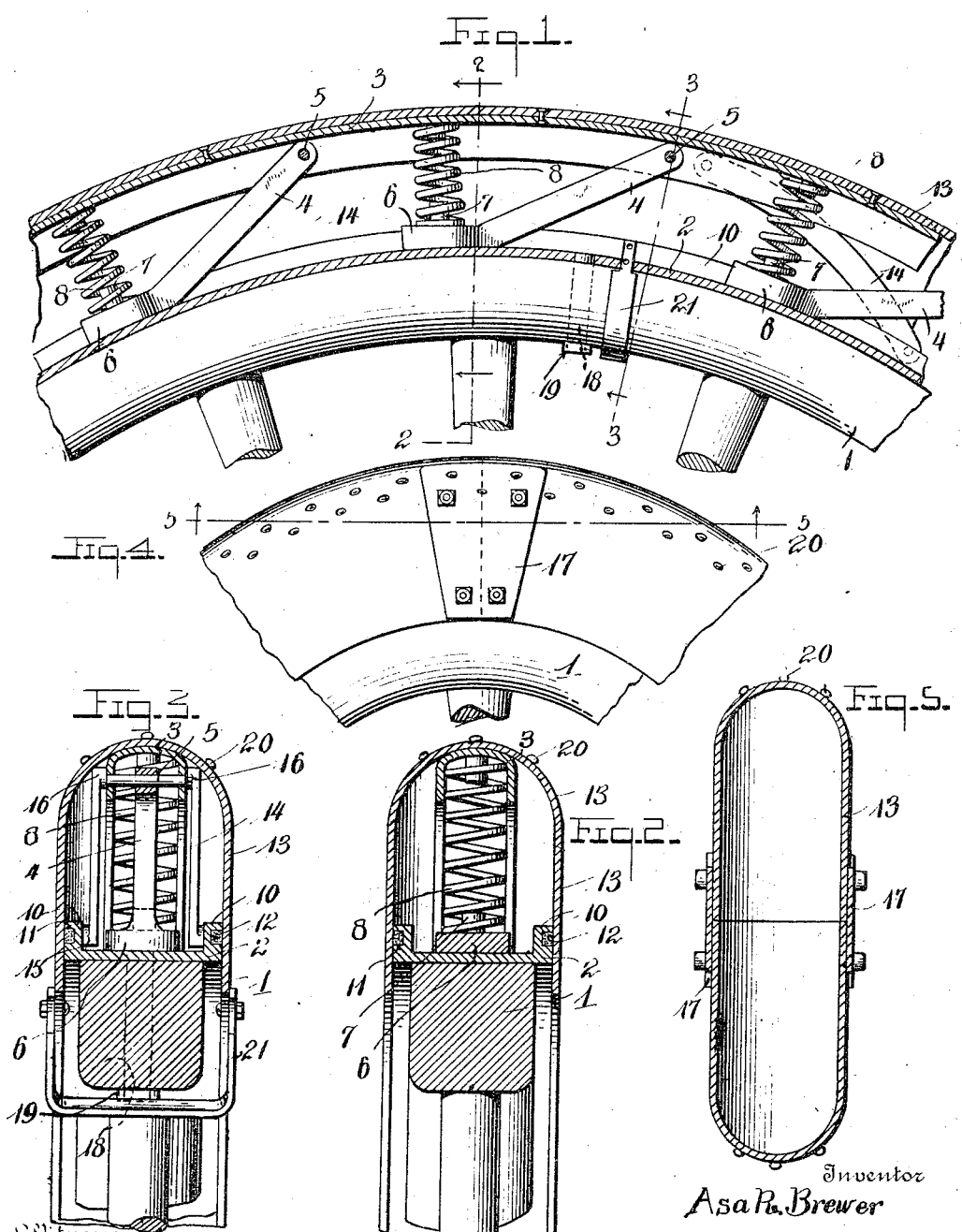

ASA R. BREWER, OF ATLANTIC, IOWA.

AUTOMOBILE-TIRE.

981,611.

Specification of Letters Patent.  Patented Jan. 17, 1911.

Application filed October 4, 1909. Serial No. 520,798.

*To all whom it may concern:*

Be it known that I, ASA R. BREWER, a citizen of the United States, residing at Atlantic, in the county of Cass, State of Iowa, have invented certain new and useful Improvements in Automobile-Tires; and I do hereby declare the following to be a full, clear, and exact description of the invention, such as will enable others skilled in the art to which it appertains to make and use the same.

This invention relates to automobile tires of the cushion type.

The object of the invention is to provide a tire of this character which shall be simple in construction, efficient and durable in use, and in which the minimum of resiliency shall be retained at all times with a maximum danger of derangement in use.

With the above and other objects in view which will later appear as the nature of the invention is better understood, the same consists in the novel construction and combination of parts as will be hereinafter fully described and claimed.

In describing the invention in detail reference will be had to the accompanying drawings forming part of this specification, wherein like characters of reference denote corresponding parts in the several views; and in which,—

Figure 1 is a view in side elevation, partly in section, of a fragment of an automobile wheel equipped with the improvements of the present invention; Fig. 2, a transverse section on the line 2—2 of Fig. 1, looking in the direction indicated by the arrows; Fig. 3, a transverse sectional view on the line 3—3 of Fig. 1, looking in the direction indicated by the arrows; Fig. 4, a detail view of a fragment of the housing shield of the tire, showing the plate which connects the adjacent ends of the housing shield; and, Fig. 5, a sectional view of the housing shield on the line 5—5 of Fig. 4, looking in the direction indicated by the arrows.

Referring to the drawings, 1 designates the felly of the wheel and 2 the inner rim, which is of metal, and 3 the outer rim which is also of metal. In order to retain the two rims in proper spaced relation to each other and also to insure the required resiliency, a series of levers 4 is employed, of which there may be any number, the outer end of each of which is pivoted to the outer rim at 5. The inner end of each lever is turned at an angle to its longitudinal axis to provide an arm 6 which bears squarely upon the inner rim 2, and carried by this extension is a stud 7 that is designed to project into the inner end of a coil spring 8, the outer end of which spring is engaged by a pin 9 carried by the outer rim 3.

As shown in Figs. 2, and 3 the outer rim 3 is approximately U-shaped in cross section, and is of considerably less width than the inner rim 2, the latter being of greater width than the felly. The inner rim 2 is provided with flanges 10 that are laterally channeled as at 11 for the purpose of receiving a packing 12 to coact with a shield 13 to preclude the entrance of dust to the interior of the tire.

In order to cause the shield 13 to move positively with the rim, two curved levers 14 are employed. Said levers are arranged respectively on each side of the longitudinal axis of the wheel and pivoted at 15 and 16 to the rims 2 and 3, as clearly shown in Fig. 3.

The shield to which reference has been made is a two-part structure and entirely houses the two rims, and a portion of the felly, and the parts of said shield are assembled by plates 17 which over-lap the adjacent ends of each part of the shield and are secured thereto by bolts or otherwise. It will of course be understood that said plates 17 correspond in formation to the cross-sectional contour of the shield and are disposed on opposite sides thereof and terminate short of the tread portion of the shield. It is designed that the shield 13 shall bear closely against the flanges 10 of the inner rim, thus to retain the packing in place, and also exclude dust or sand, in order to insure proper working of the levers and thus maintain the resiliency of the tire throughout prolonged use. There is an oil tube 18 combined with the felly which enters the chamber defined by the shield and has a closure or cap 19. When oil has once been supplied to the interior of the tire it will remain there almost indefinitely so that the action of the spring and the easy working of the series of levers upon their pivots will be assured, while rust of the parts which would lead to breakage is prevented.

A series of U-shaped braces 21 designed to prevent the spreading of the shield 13 are disposed around the under side of the felly 1 and have their free ends secured to the free ends of said shield. It will of course be understood that the bight portion of said brace is spaced away from the inner side of the felly to permit of movement of the shield and the outer rim 3 toward the center of the wheel.

To render the tire non-skidding as far as is possible the tread portion of the shield is provided with closely assembled studs or projections 20 which may be either integral with the shield or secured thereto in any preferred manner.

It will be seen from the foregoing description, that although the improvements herein described are simple in character they will be thoroughly effective for the purposes designed and will coact in the production of a durable and practical form of automobile tire.

What is claimed is:

In a cushion tire, an inner rim, an outer rim, a plurality of bent levers disposed between said rims, one arm of each lever being pivotally connected to the outer rim and the bend of each lever resting on the inner rim to form a fulcrum, and a plurality of springs each interposed between the remaining arm of each lever and the outer rim.

In testimony whereof, I affix my signature, in presence of two witnesses.

ASA R. BREWER.

Witnesses:
 Sir W. W. Straight,
 Charles O. Brewer.